United States Patent
Schulz et al.

(10) Patent No.: US 11,685,088 B2
(45) Date of Patent: Jun. 27, 2023

(54) INJECTION MOLDING DEVICE, METHOD FOR INJECTION MOLDING MULTICOMPONENT PARTS, USE OF A PLACEHOLDER ELEMENT, AND COMPUTER PROGRAM AND COMPUTER-READABLE MEDIUM

(71) Applicant: Zahoransky Automation & Molds GmbH, Freiburg (DE)

(72) Inventors: Jurgen Schulz, Freiburg (DE); Matthias Hanser, Bad Krozingen (DE); Winfried Ebner, Emmendingen (DE)

(73) Assignee: Zahoransky Automation & Molds GmbH, Freiburg (DE)

( * ) Notice: Subject to any disclaimer, the term of this patent is extended or adjusted under 35 U.S.C. 154(b) by 7 days.

(21) Appl. No.: 17/022,250

(22) Filed: Sep. 16, 2020

(65) Prior Publication Data

US 2021/0086416 A1 Mar. 25, 2021

(30) Foreign Application Priority Data

Sep. 19, 2019 (DE) .......................... 102019125252.0

(51) Int. Cl.
| | |
|---|---|
| *B29C 45/06* | (2006.01) |
| *B29C 45/14* | (2006.01) |
| *B29C 45/66* | (2006.01) |
| *B29C 45/80* | (2006.01) |

(52) U.S. Cl.
CPC ........ *B29C 45/14467* (2013.01); *B29C 45/06* (2013.01); *B29C 45/66* (2013.01); *B29C 45/80* (2013.01)

(58) Field of Classification Search
CPC ....... B29C 45/16; B29C 45/03; B29C 45/162; B29C 45/00; B29C 45/66
See application file for complete search history.

(56) References Cited

U.S. PATENT DOCUMENTS

| | | | |
|---|---|---|---|
| 7,220,118 B2 | 5/2007 | Nishizawa et al. | |
| 8,651,845 B2* | 2/2014 | Kaczmarek | B29C 45/03 |
| | | | 425/444 |
| 10,800,077 B2 | 10/2020 | Hubert et al. | |
| 2005/0095311 A1* | 5/2005 | Nishizawa | B29C 45/062 |
| | | | 425/375 |

(Continued)

FOREIGN PATENT DOCUMENTS

| | | |
|---|---|---|
| DE | 102004053573 | 6/2005 |
| DE | 102011102449 | 11/2012 |
| DE | 102011120403 | 6/2013 |

(Continued)

*Primary Examiner* — Jacob T Minskey
*Assistant Examiner* — Debjani Roy
(74) *Attorney, Agent, or Firm* — Volpe Koenig, P.C.

(57) ABSTRACT

The production of multicomponent parts (4) which include a functional part (3), in particular a hollow needle, onto which a plastic molding (2), in particular a syringe barrel (2), is molded. In order to be able to convert the injection molding device quickly and conveniently, the device has a changing device (11), by which it is possible optionally to move functional part holders (7, 8, 9), matched to different types of functional parts, and/or a functional part holder (8) and a placeholder element (10) into the use position thereof in front of a mold cavity (6) of the injection mold (5) of the injection molding device (1).

12 Claims, 6 Drawing Sheets

(56) References Cited

U.S. PATENT DOCUMENTS

2013/0142897 A1* 6/2013 Kaczmarek ............. B29C 45/42
                                                          425/126.1
2015/0123311 A1* 5/2015 Zahn ..................... B29C 45/261
                                                          425/129.1

FOREIGN PATENT DOCUMENTS

| WO | 2012150897 | 11/2012 |
|----|------------|---------|
| WO | 2016124869 | 8/2016  |

* cited by examiner

INJECTION MOLDING DEVICE, METHOD FOR INJECTION MOLDING MULTICOMPONENT PARTS, USE OF A PLACEHOLDER ELEMENT, AND COMPUTER PROGRAM AND COMPUTER-READABLE MEDIUM

INCORPORATION BY REFERENCE

The following documents are incorporated herein by reference as if fully set forth: German Patent Application No. 10 2019 125 252.0, filed Sep. 19, 2019.

TECHNICAL FIELD

The invention relates to an injection molding device having an injection mold which has at least one mold cavity for at least partially accommodating a functional part and for molding a plastic molding onto the functional part to form a multicomponent part, in particular a syringe.

BACKGROUND

Injection molding devices of the type stated at the outset are already known from documents DE 10 2011 102 449 A1 and DE 10 2011 120 403 A1. A horizontal injection molding machine for a plurality of materials is already known from document DE 10 2004 053 573 B4.

Injection molds of this kind are already known from practical experience and are used, for example, to produce multicomponent parts in the form of syringes. In this context, a syringe barrel is molded as a plastic molding onto a functional part in the form of a hollow needle. In addition to medical technology, numerous uses in the electronics sector are also conceivable, for example.

Hitherto, multicomponent parts of this kind have been produced by inserting the functional part into a mold plate or mold half of an opened injection mold. The injection mold is then closed, and the plastic molding is injection molded. After cooling, the injection mold is opened, and the finished multicomponent part/plastic molding can be removed. Further multicomponent parts are then produced in a corresponding manner.

When there is a change in model, that is to say when, for example, syringes with different needle diameters are to be produced, it is necessary to convert the injection molding device. Previously, this was associated with great manual effort.

SUMMARY

It is therefore the object of the invention to propose an injection molding device and a method for injection molding multicomponent parts which favor efficient conversion of the injection molding device/plastic molding.

To achieve the object, an injection molding device of the type stated at the outset is first of all provided, said device having one or more features of the invention described herein, which is directed to an injection molding device of this kind. To achieve the object, it is provided, in particular, that the injection molding device has at least one first functional part holder for a first type of functional part and at least one further functional part holder for a further type of functional part, and/or at least one placeholder element, and that the injection molding device comprises a changing device, by which the first functional part holder and the at least one further functional part holder and/or the placeholder element as a placeholder for a functional part holder can optionally be positioned in the respective use position thereof on the mold cavity.

If a change of type is planned, it is possible with the aid of the changing device to change from one functional part holder to the other functional part holder. For this purpose, the other functional part holder is positioned in its use position on the mold cavity with the aid of the changing device. The functional part holders serve to hold the functional parts onto which a plastic molding is to be molded in order to produce a multicomponent part in their injection molding position required for the injection molding step. In their injection position, the functional parts to be overmolded project at least partially into the at least one mold cavity of the injection molding device.

Since each of the at least two different functional part holders is matched to one particular type of functional part, it is now possible, with the aid of the changing device of the injection molding device, to convert said device more or less by pressing a button in order to produce a different multicomponent part, during which functional parts of the other type of functional part are overmolded.

However, the injection molding device according to the invention also has advantages in respect of protection of the environment and recycling. Particularly during commissioning, in the case of repairs or conversion processes on injection molding devices of the type stated at the outset, it is often advantageous not to stop them, which would cause them to cool down, but to continue operating them and, in the process, to accept that reject moldings will be produced. Such reject moldings are often also referred to as premoldings. In the case of the injection molding devices which are already known from practical experience and are used to produce multicomponent parts, it was often also the case, where such premoldings were produced, that functional parts continued to be inserted into the injection mold and overmolded with the plastic moldings. Particularly in the abovementioned situations, i.e. during commissioning, startup, repairs or conversion processes on injection molding devices of this kind, there is thus production of premoldings which, due to the firm connection between the plastic moldings and the functional parts, can be recycled only at some expense. To be able to recycle these reject moldings properly, the functional parts, which are often made of metal, must be separated from the plastic moldings so that these can then be taken for recycling after being properly separated from one another.

This production of rejects, in which essentially satisfactory functional parts are connected to plastic moldings which are not yet satisfactory due to the startup process, gives rise to unnecessary costs and represents an avoidable waste of materials.

With the aid of the injection molding device, it is possible to prevent any functional parts being overmolded with plastic moldings in the event of rejects being produced. For this purpose, the placeholder element is positioned in its use position on the mold cavity with the aid of the changing device and there replaces a functional part holder having a functional part. The placeholder element then has the function of closing the mold cavity. During this process, the placeholder element does not hold a functional part but can be positioned in its use position in front of an opening of the mold cavity, through which a functional part would project at least partially into the mold cavity. In the best case, the placeholder element acts as a closure element, which closes, in particular seals off, the mold cavity from the outside in the case of reject production or preproduction. In this way, it is possible to continue operating the injection molding device and to continue producing premoldings without the expensive functional parts until correct operation of the injection molding device can be initiated. Since the quality of plastic in feed runners of the injection molding device may deteriorate if the injection molding device is halted, it is often more advantageous to produce such reject moldings or premoldings without functional parts than to stop the entire injection molding device. Moreover, continued operation of the injection molding device makes it possible to avoid curing of the plastic within the feed runners, which would prevent the use of the injection molding device.

According to the invention, the changing device comprises at least one rotary holder, on which the at least one first functional part holder and the at least one further functional part holder and the at least one placeholder element are arranged and/or formed. With the aid of the rotary holder, it is then optionally possible to position one of the two functional part holders and/or the at least one first placeholder and the at least one first placeholder element in the use position thereof on the mold cavity.

According to the invention. the changing device can have a driving device for the at least one rotary holder thereof. The driving device can comprise a drive belt, via which a drive motor of the driving device is connected to the at least one rotary holder. In one embodiment of the injection molding device, said device has a plurality of rotary holders. This is advantageous particularly if the injection mold of the injection molding device is designed as a multiple mold, by which a plurality of multicomponent parts can be molded simultaneously. In this context, it may be advantageous if the driving device already mentioned above comprises a drive belt by which the drive motor of the driving device is connected to a plurality or even all of the rotary holders. In this way, it is possible for a plurality or even all of the rotary holders to be operated by one and the same drive motor in order, depending on requirements, to position the at least one first functional part holder and the at least one further functional part holder and/or the at least one placeholder element in the use position thereof on the mold cavity to which they are respectively assigned.

The changing device can furthermore have a locking device, by which the at least one rotary holder can be fixed in a selected rotational position. The locking device can have, for example, a latching lever having at least one latching element, which engages in a corresponding mating latching element on the rotary holder in the locking position of the locking device.

The functional parts overmolded with the plastic molding can be needles or hollow needles for syringes, for example. Accordingly, the abovementioned functional part holders can be designed as needle holders, wherein the first functional part holder can be matched to the first needle diameter and the at least one further functional part holder can be matched to the other needle diameter. In this way, it is a particularly simple matter to convert the injection molding device to the production of syringes with needles of one diameter to the production of syringes with needles of a different diameter.

Moreover, it may furthermore be advantageous if the injection molding device has respective openable mold inserts for each mold cavity of the injection mold. The mold inserts can serve to define a front part of the multicomponent parts to be produced. The openable mold inserts make it possible to mold and remove plastic moldings with bevels or undercuts.

The injection mold can have at least three mold plates, which can be adjusted between a closed injection position and a processing position with respective mold plates spaced apart from one another. In this case, the mold cavity can be formed between two adjacent mold plates, while the at least one first functional part holder and the at least one further functional part holder and/or the at least one placeholder element can be arranged on the third mold plate.

The changing device can be arranged on the abovementioned third mold plate, in particular on a rear side of the third mold plate facing away from the other two mold plates.

The at least one first functional part holder and/or the at least one further functional part holder can each have an insertion funnel for inserting a functional part. An insertion funnel of this kind facilitates the automatic insertion of a functional part into the functional part holder.

Moreover, the at least one first functional part holder and/or the at least one further functional part holder can each have a clamping sleeve and/or can be designed as a clamping sleeve. Clamping sleeves are suitable particularly for fixing sensitive functional parts in the form of needles or hollow needles for syringes for molding on a plastic molding in order to be able to hold said parts in a correct injection position.

The injection molding device can furthermore have a clamping device. With the aid of the clamping device, functional parts which are held in the at least one first functional part holder and/or in the at least one further functional part holder can be firmly clamped. In this way, the positions of the functional parts in the functional part holders can be reliably defined in order then to be able to mold the plastic moldings onto the fixed functional parts.

The clamping sleeve can have a clamping slot, which can preferably extend in the longitudinal direction of the clamping sleeve. The clamping slot serves to enable the clamping sleeve to be deformed relatively easily by pressure, in particular pressure exerted radially thereon, in order to be able to firmly clamp a functional part inserted into the clamping sleeve to said sleeve.

The clamping slot can have a widened portion in the region of each of its two ends in order to weaken the material of the clamping sleeve. In the region of the ends of the clamping slot, the material of the clamping sleeve can thus be relatively thin, which can promote the deformability of the clamping sleeve. Thus, a clamping section of the clamping sleeve, which is arranged or formed between the two widened portions at the ends of the clamping slot and/or is defined by these, can be deformed relatively easily and, above all, in a defined manner, by pressure exerted on the clamping sleeve.

The clamping sleeve can thus have a clamping section which comprises an outer pressure surface, which can be acted upon by a clamping ram of the clamping device to narrow a functional part receptacle of the clamping sleeve.

To firmly clamp a functional part, said part can be pushed into the functional part receptacle of the clamping sleeve of the functional part holder. By virtue of the clamping slot extending in the longitudinal direction of the clamping sleeve, the functional part receptacle can be narrowed by the outer pressure surface of the clamping section of the clamping sleeve being acted upon exteriorly by the clamping ram of the clamping device. In this case, the clamping ram can preferably be fed in transversely or radially to the longitudinal direction of the clamping sleeve.

The injection molding device can furthermore have a functional part insertion device. With the aid of the functional part insertion device, it is possible to insert the functional parts into the at least one first functional part holder and/or into the at least one further functional part holder. The functional part insertion device can be designed as a handling gripper, by which the functional parts can be fed to the functional part holders of the injection molding device from a functional part supply of the injection molding device.

To achieve the object, a method for injection molding multicomponent parts, in particular syringes, using an injection molding device, in particular an injection molding device having one or more of the features described herein, is furthermore also provided.

In particular, in the case of the method it is provided that a functional part of a first type of functional part is held in the injection position by a first functional part holder matched thereto, projecting at least partially into a mold cavity of the injection molding device, when the intention is to produce a multicomponent part having a functional part of the first type of functional part. If the intention is to produce a multicomponent part having a functional part of the at least one further type of functional part, a functional part of at least one further type of functional part is held in the injection position by a further functional part holder matched thereto, projecting at least partially into the mold cavity of the injection molding device. In addition or alternatively, a placeholder element as a placeholder for a functional part holder with a functional part is moved in front of an opening of the mold cavity for a functional part when the intention is to produce moldings without functional parts. In this case, the first functional part holder and the at least one further functional part holder and/or the placeholder element are positioned in the use position thereof with the aid of a changing device of the injection molding device.

The method thus allows conversion of the injection molding device at the press of a button. In this way, the injection molding device can be converted from the production of multicomponent parts having functional parts of one type of functional part to the production of multicomponent parts of a different type of functional part without major effort.

The method according to the invention furthermore makes it possible to avoid wasting functional parts if the injection molding device is not yet in a correct operating state but the injection molding device should not or cannot be halted. By virtue of the placeholder element that has already been explained in detail above, the premoldings or reject moldings that are inevitably formed during this process can be produced even without the expensive functional parts. The reject moldings which are formed during this process do not have any relatively expensive functional parts that are difficult to separate from said moldings, and they can therefore be taken directly for recycling without expensive separating measures.

To achieve the object, the use of a placeholder element on an injection molding device having one or more of the features described herein is also provided. During this process, the placeholder element is used as a placeholder instead of a functional part holder in front of a mold cavity of the injection mold of the injection molding device when the intention is to produce moldings without a functional part. During this process, the placeholder element can be moved in front of an opening of the mold cavity for the functional parts instead of a functional part holder in order to produce premoldings without functional parts on the injection molding device. The placeholder element serves to enable the injection molding device to continue to be operated, even when no functional parts are to be overmolded with plastic moldings.

Finally, to achieve the object, a computer program is also provided which has one or more of the features described herein directed to such a computer program. Thus, to achieve the object, it is provided, in particular, for a computer program comprising commands which ensure that the injection molding device having one or more of the features described herein carries out the method as described herein.

In this case, the computer program can be stored on a computer-readable medium as claimed in the independent claim directed to a computer-readable medium of this kind.

BRIEF DESCRIPTION OF THE DRAWINGS

The invention is now described in greater detail with reference to an illustrative embodiment, but it is not restricted to this illustrative embodiment. Further illustrative embodiments can be obtained by combining the features of one or more claims and/or in a combination of one or more features of the illustrative embodiment.

In the, in part, highly schematized illustration:

FIG. 5)

DETAILED DESCRIPTION

FIGS. 1 to 15 show at least parts of an injection molding device denoted overall by 1.

The injection molding device 1 serves to mold plastic moldings 2 onto functional parts 3 for the production of multicomponent parts 4.

In the illustrative embodiment under consideration, the injection molding device 1 serves to mold the syringe barrel 2 made of plastic onto needles or hollow needles 3 to form syringes 4.

For this purpose, the injection molding device 1 has an injection mold 5, which has or defines at least one mold cavity 6. The mold cavity 6 serves to partially accommodate a functional part 3 and to mold the plastic molding 2 onto the functional part 3 to form the multicomponent part 4.

The injection mold 5 of the injection molding device 1 is designed as a multiple injection mold and, in the illustrative embodiment shown, has a total of four mold cavities 6.

For each of the mold cavities 6, the injection molding device 1 has a first functional part holder 7 for a first type of functional part, a second functional part holder 8 for a second type of functional part, and a third functional part holder 9 for a third type of functional part, as well as a placeholder element 10. The placeholder element 10 can be positioned instead of each functional part holder 7, 8, 9 in front of the mold cavity 6 assigned thereto when the intention is to produce premoldings without the functional part 3. This is continued, during the startup of the injection molding device 1 for example, until the injection molding device 1 has reached its operating temperature and can produce the multicomponent parts 4 with the required quality.

The injection molding device 1 is fitted with a changing device 11, by which the first functional part holder 7, the second functional part holder 8, the third functional part holder 9 and the placeholder element 10 can optionally be positioned in their respective use position on the mold cavity 6 to which they are assigned.

In the illustrative embodiment shown, hollow needles 3 are used as functional parts 3, said needles having a ground surface on their distal end. A plastic molding 2 in the form of a syringe barrel is molded onto a hollow needle 3 in order to produce a multicomponent part 4 in the form of a syringe.

Each of the three different functional part holders 7, 8 and 9 serves to accommodate a particular needle type, i.e. type of functional part. In this case, the functional parts 3 that can be accommodated by the functional part holders 7, 8 and 9 differ from one another in respect of their diameter and/or their length, for example.

Figure 11:
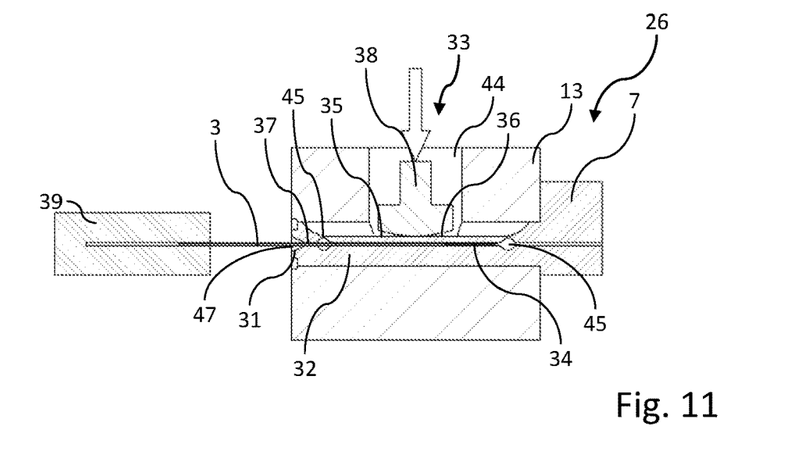
FIG. 11 shows a sectioned illustration, similar to FIG. 10, of the elements shown in FIG. 10, wherein in this case the functional part insertion device has already been pulled back slightly again after the insertion of the functional part into the functional part holder, while the functional part is firmly clamped and thus fixed with the aid of the clamping ram of the clamping device, thus enabling the functional part insertion device to be removed from the functional part.
Figure 12:
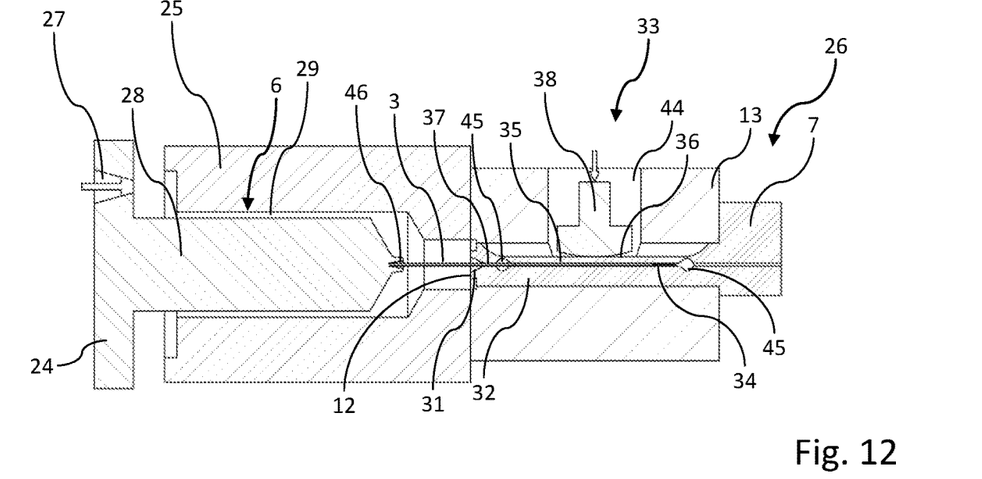
FIG. 12 shows a highly schematized, sectioned view of the injection mold, wherein in this case a first mold plate having a hot runner nozzle and an injector pin, a second mold plate having a partial cavity for the syringe barrel, and parts of a third mold plate, which has already been illustrated in FIGS. 10 and 11, can be seen.
Figure 13:
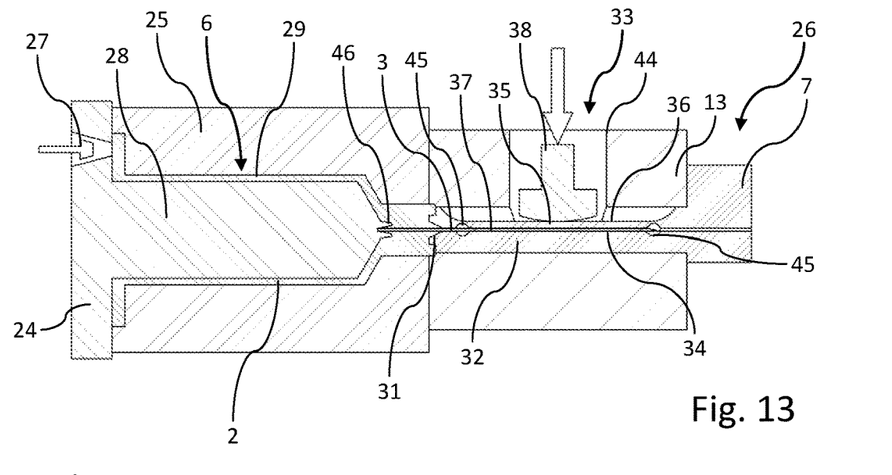
FIG. 13 shows a sectioned view of the closed injection mold shortly before the injection of the plastic to mold the plastic molding onto the inserted functional part, wherein the inserted part has been pushed into its injection position with the aid of the injector pin, and wherein the clamping ram presses with a relatively high force on the functional part holder and the functional part clamped therein in order to hold said part in the position required for correct injection molding.

The function of the functional part holders 7, 8 and 9 is readily apparent from FIGS. 10 to 14. These are used to hold functional parts 3, in this case hollow needles 3 for the production of syringes 4, during the molding of a plastic molding 2 in the form of a syringe barrel onto the functional parts 3 in the injection position thereof. FIG. 13 shows the first functional part holder 7 in its use position in front of the mold cavity 6, wherein it fixes a hollow needle 3 as a functional part 3 in its injection position, with the result that it projects at least partially into the mold cavity 6 of the injection mold 5 in order then to be overmolded with plastic to form a syringe barrel as a plastic molding 2.

Figure 15:
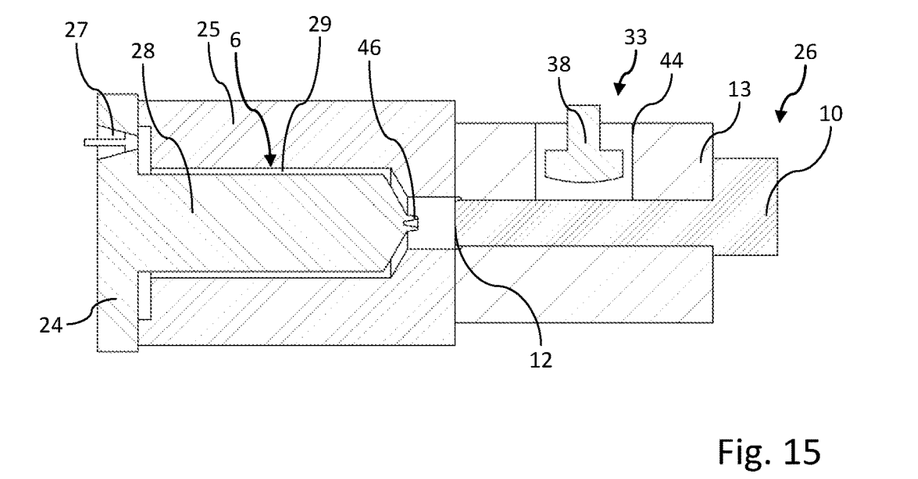
FIG. 15 shows a sectioned illustration of the injection mold that has already been shown in the previous figures, with mold plates in the injection position, wherein in this case the placeholder element can be seen in its use position on the mold cavity instead of a functional part holder in order to produce premoldings without functional parts and thus avoid the wastage of functional parts in the production of reject moldings.

FIG. 15 shows the placeholder element 10 in its use position as a placeholder for one of the functional part holders 7, 8, 9 in front of the mold cavity 6 of the injection mold 5. In this case, the placeholder element 10 covers an opening 12 of the mold cavity 6 for the functional part 3 and closes it off from the outside.

The changing device 11 comprises a total of four rotary holders 13. Arranged on each of the rotary holders 13 is a first functional part holder 7, a second functional part holder 8, a third functional part holder 9 and a placeholder element 10.

The injection molding device 1 comprises a driving device 14 for the rotary holders 13. A driving device 14 has a drive belt 15, via which a drive motor 16 of the driving device 14 is connected to the rotary holders 13. Via the drive belt 15, the motive power of the drive motor 16 can be transmitted to all the rotary holders 13. Thus, the rotary holders 13 can be adjusted simultaneously with the aid of a single drive motor 16.

Figure 2:
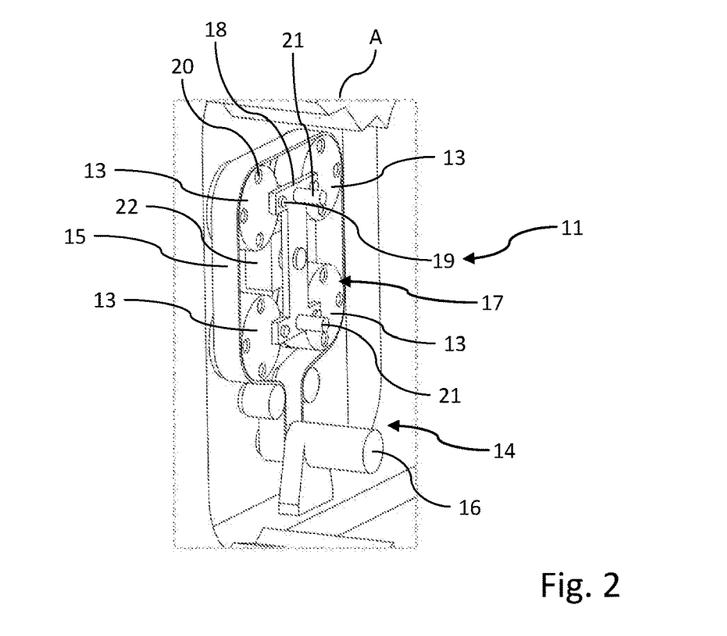
FIG. 2 shows the detail indicated by the letter A in FIG. 1 in an enlarged illustration.
Figure 3:
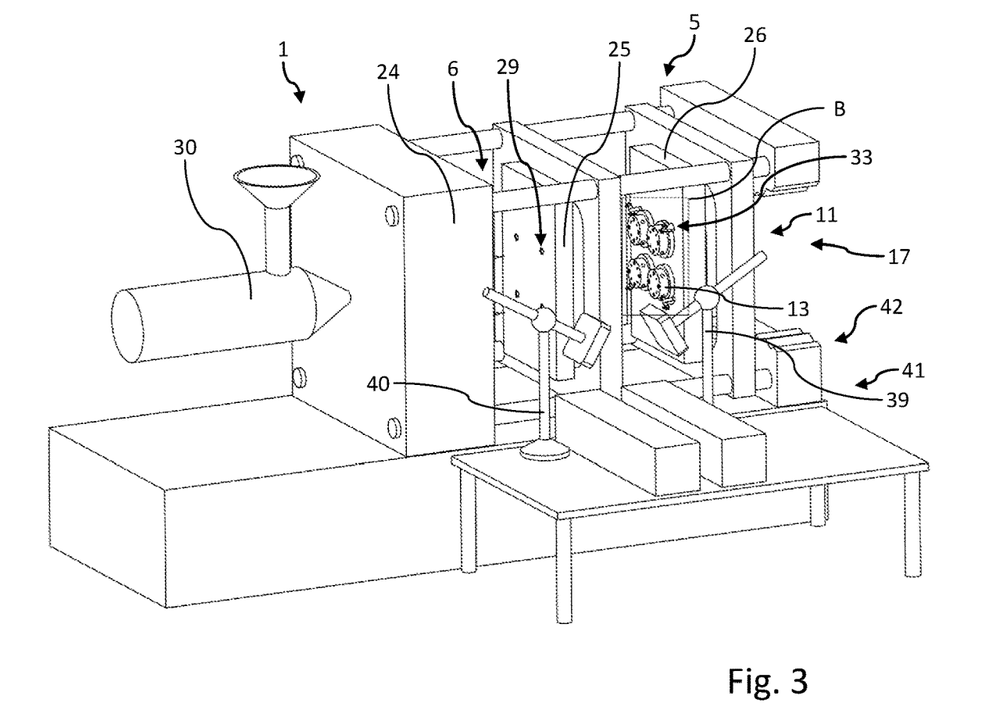
FIG. 3 shows a perspective, partially cut-away illustration of the injection molding device illustrated in the previous figures.
Figure 4:
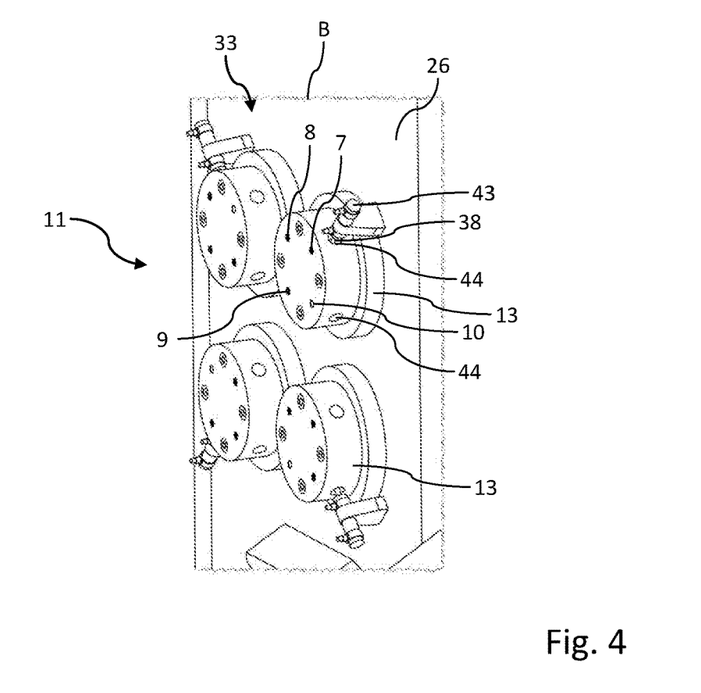
FIG. 4 shows the detail indicated by the letter B in FIG. 3 in an enlarged illustration, wherein in this case four rotary holders of a changing device of the injection molding device, each having three different functional part holders and a placeholder element, can be seen.
Figure 5:
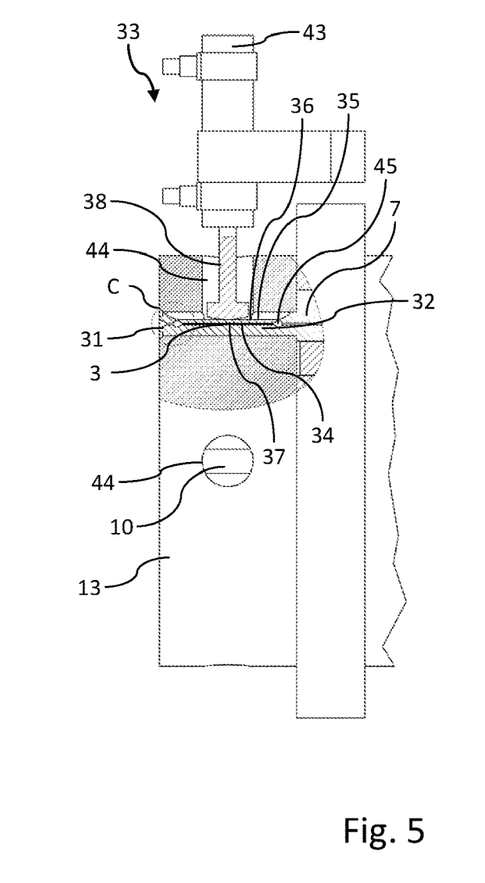
FIG. 5 shows a partially cut-away illustration of one of the rotary holders shown in the previous figures to illustrate the mode of operation of a clamping device of the injection molding device, with a clamping ram in the clamping position.
Figure 6:
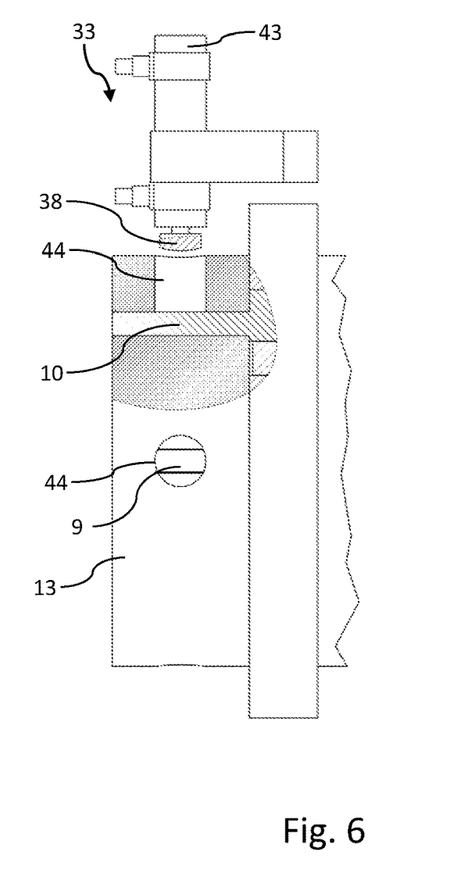
FIG. 6 shows the rotary holder shown in FIG. 5 with the clamping ram of the clamping device released, wherein in this case a placeholder element can be seen in its use position, instead of a functional part holder (cf.
Figure 7:
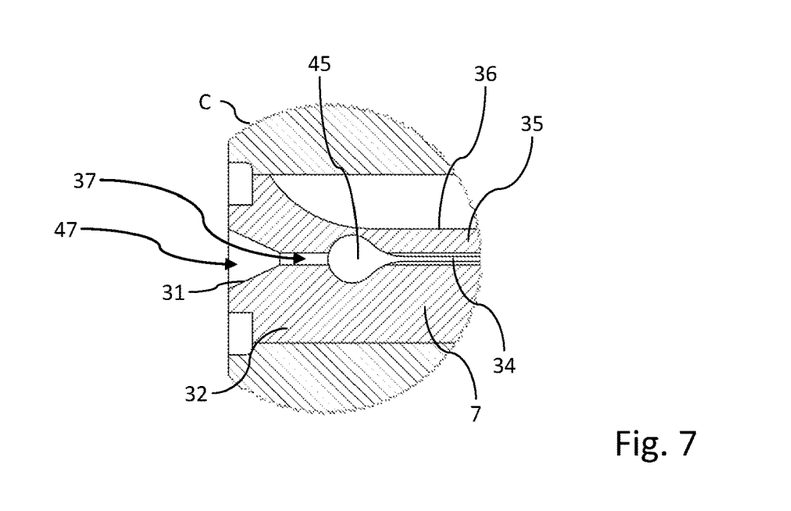
FIG. 7 shows the detail indicated by the letter C in FIG. 5 in an enlarged illustration, wherein in this case the functional part holder is designed as a clamping sleeve and an insertion funnel of the functional part holder and a functional part receptacle formed in the functional part holder as well as a clamping slot that weakens the material of the functional part holder can be seen.
Figure 8:
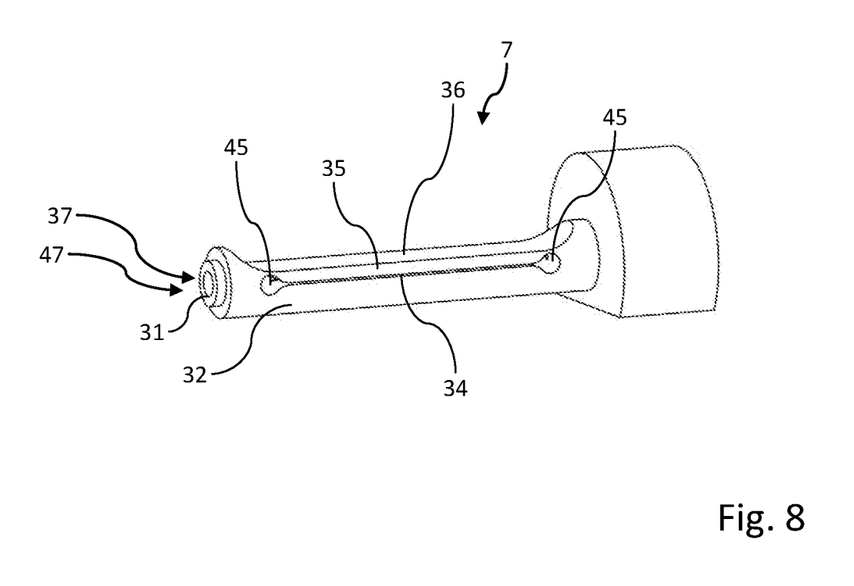
FIG. 8 shows the functional part holder from FIGS. 5 and 7 in an enlarged illustration, wherein in this case it is particularly clearly evident that the functional part holder is designed as a slotted clamping sleeve.
Figure 9:
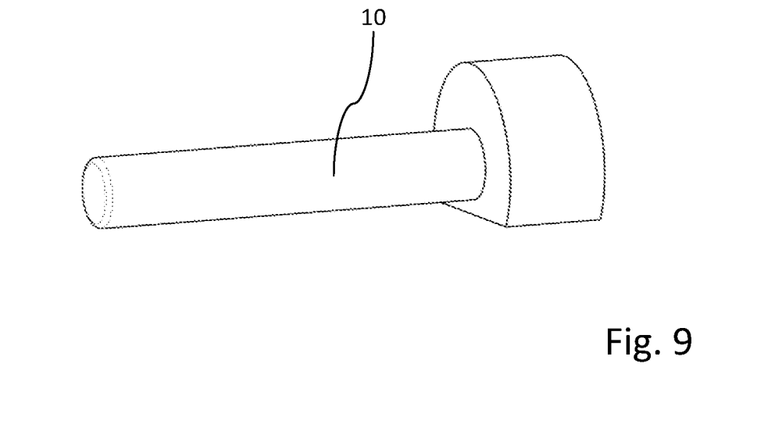
FIG. 9 shows, in perspective view, the placeholder element illustrated in section in FIG. 6.

The injection molding device 1 furthermore comprises a locking device 17, which is particularly clearly visible in the enlarged detail view of the detail A shown in FIG. 2. The locking device 17 serves to lock the rotary holders 13 in a selected rotational position.

The locking device 17 comprises a locking lever 18, on which four locking pins 19 are arranged. On their rear side, which faces the locking lever 18, the rotary holders 3 each have four locking holes 20 for the locking pins 19. The four locking holes 20 of a rotary holder 13 are arranged in manner offset uniformly from one another around an axis of rotation of the rotary holder 13, on the rear side of the rotary holder 13, and each define one rotational position of the rotary holder 13. On a rear side of the locking lever 18, which faces away from the locking pins 19, two guide pins 21 can be seen. They serve to guide the stroke motion of the locking lever 18 caused by a stroke cylinder 22 of the locking device 17 to lock or release the rotary holders 13.

Figure 1:
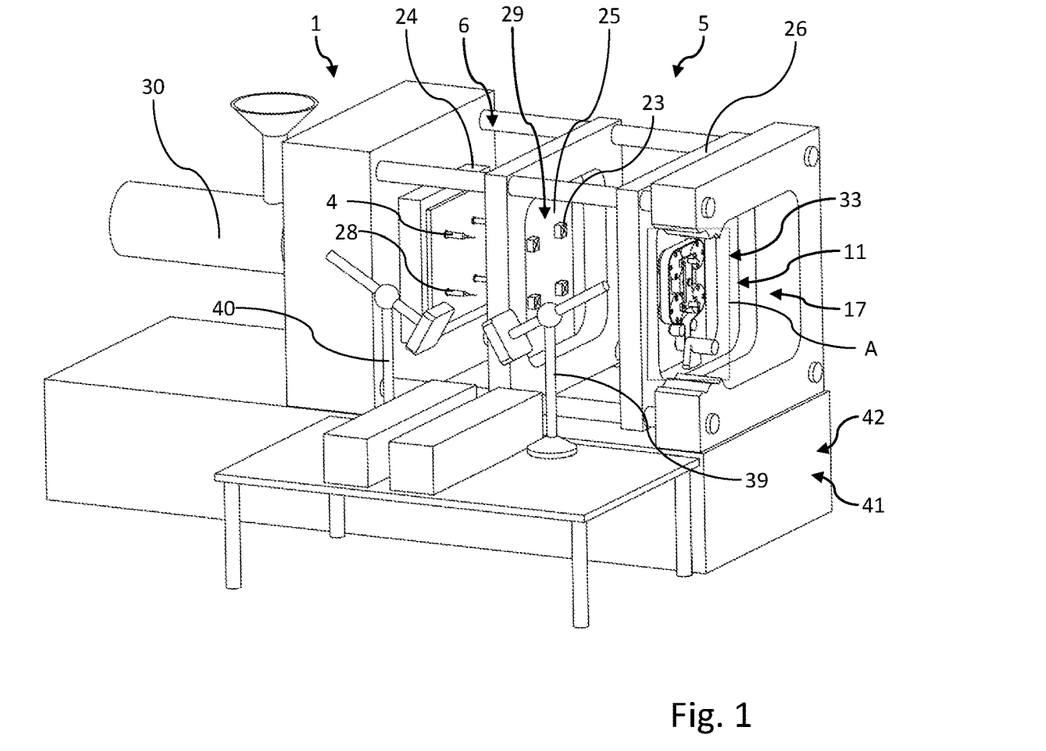
FIG. 1 shows a perspective, partially cut-away illustration of an injection molding device, wherein an injection mold of the injection molding device can be seen which has a total of three mold plates, which are in the processing positions and are each spaced apart from one another.

FIG. 1, in particular, shows that the injection molding device 1 has openable mold inserts 23 for each of its total of four mold cavities 6. They serve to define a front part of the multicomponent parts 4 to be produced, in this case the syringes 4. The openable mold inserts 23 make it possible to mold plastic moldings 2 with bevels or undercuts.

The injection mold 5 comprises a total of three mold plates 24, 25 and 26. The mold plates 24, 25 and 26 can be adjusted between a closed injection position (see FIGS. 13 and 15, for example) and a processing position with the respective mold plates 24, 25 and 26 spaced apart (see FIGS. 1 and 3, for example). In this case, the mold cavities 6 are formed between the mold plate 24, which can also be referred to as the nozzle-side mold plate 24, and the central mold plate 25. The functional part holders 7, 8, 9 and the placeholder elements 10 are arranged on the third mold plate 26. The changing device 11 of the injection molding device is also arranged on the third mold plate 26 and, in this case, on a rear side of the third mold plate 26 facing away from the other two mold plates 24 and 25.

FIGS. 12 to 15 furthermore show that, apart from hot runner nozzles 27, the nozzle-side mold plate 24 also has injection molding mandrels 28. When the mold plates 24, 25 and 26 are in the closed or injection position, the injection molding mandrels 28 have been inserted into correspondingly designed partial cavities 29 of the central mold plate 25 and define the shape of the syringe barrels 2 to be molded onto the inserted parts 3, in this case the hollow needles 3.

The injection molding device 1 has an injection unit 30, which is connected via a corresponding hot runner system to the hot runner nozzles 27 in the nozzle-side mold plate 24.

The functional part holders 7, 8 and 9 each have an insertion funnel 31 for inserting the functional parts 3 into the functional part holders 7, 8, 9. Furthermore, each of the functional part holders 8, 9 additionally comprises a clamping sleeve 32 or is designed as such. The functional parts 3 thus enter the clamping sleeves 32 of the functional part holders 7, 8, 9 through the insertion funnels 31.

The injection molding device 1 has a clamping device 33. With the aid of the clamping device 33, the functional parts 3 can be clamped firmly in the clamping sleeve 32 of the functional part holders 7, 8 and 9. The clamping sleeves 32 each have a clamping slot 34 extending in the longitudinal direction of the respective clamping sleeve 32. A clamping slot 34 of this kind is particularly clearly evident in FIGS. 5 to 8. In the region of both its ends, the clamping slot 34 has a widened portion 45 to weaken the material of the clamping sleeve 32 and makes it possible to deform said sleeve relatively easily in a reversible manner. The clamping sleeve 32 is provided with a clamping section 35, which is formed between the two widened portions 45 of the clamping slot 34. The clamping section 35 has an outer pressure surface 36. To narrow a functional part receptacle 37 of the clamping sleeve 32, into which the functional parts 3 designed as hollow needles can be inserted, this outer pressure surface 36 of the clamping section 35 of the clamping sleeve 32 can be acted upon by a clamping ram 38 of the clamping device 33.

To actuate the clamping ram 38, the clamping device 33 has a pressure cylinder 43 for each clamping ram 38. The clamping rams 38 are each fed in through an insertion opening 44 in the rotary holders 13. Each rotary holder 13 has an insertion opening 44 at least for each of the three functional part holders 7, 8, 9.

Figure 14:
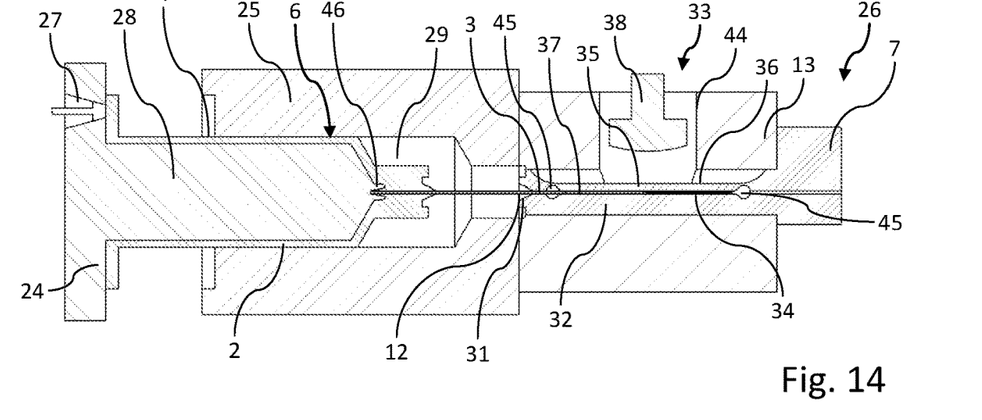
FIG. 14 shows the injection mold, which has already been partially opened to remove the finished multicomponent part, wherein in this case the clamping ram is arranged in a released position or open position.

The injection molding mandrels 28 each have a receiving depression 46 at their distal end. This serves to receive a proximal end of a functional part 3. FIGS. 12 to 14 illustrate that the functional parts 3 are moved into their injection position with the aid of the injection molding mandrels 28 and the receiving depressions 46 thereof as the injection mold 5 is closed.

The receiving depressions 46 furthermore ensure that the hollow needles 3 on the finished syringe 4 remain open, i.e. are not blocked with plastic material during the injection molding of the syringe barrel 2.

The injection molding device 1 furthermore has a functional part insertion device 39. By the functional part insertion device 39, the functional parts 3 can be inserted into clamping sleeves 32 of the functional part holders 7, 8 and 9, depending on which functional part holder 7, 8 and 9 is arranged in the use position.

The functional part insertion device 39 is designed to insert four functional parts 3 simultaneously into the functional part holders 7, 8, 9 and the clamping sleeves 32 thereof.

With the aid of a removal gripper 40, four finished multicomponent parts 4 in this case therefore syringes, can be removed simultaneously from the injection mold 5.

The method described below can be carried out on the injection molding device 1 described above. In this case, a functional part 3 of a first type of functional part is held in the injection position by a first functional part holder 7 matched thereto, projecting at least partially into a mold cavity 6 of the injection molding device 1, when the intention is to produce a multicomponent part 4 having a functional part 3 of the first type of functional part. A functional part 3 of at least one further type of functional part can be held in the injection position with the aid of at least one further functional part holder 8, 9 matched thereto, projecting at least partially into the mold cavity 6, when the intention is to produce a multicomponent part 4 having a functional part 3 of the further type of functional part.

As the injection molding device is started up or after relatively long pauses between injections, it may happen that the injection mold is too cold to ensure the desired high quality of the moldings. Although the injection mold could be preheated, this would require additional heating equipment and would thus be complicated and expensive. Moreover, it can be difficult to map the temperature characteristic of a regular injection cycle within the injection mold. Usually therefore, a number of injection operations are carried out until the injection molding device has been raised to the operating temperature.

The moldings produced during this process are referred to as premoldings and must be segregated out. Since the functional parts 3 may have barbs, projections or other regions which ensure secure and firm connection to the plastic molding 2, separation of the functional part 3 and the injected material of the segregated premoldings to allow fully sorted removal or reuse of the different materials is possible only with a great amount of effort. Moreover, it is generally not possible to recycle the functional parts, leading to high additional costs.

This problem is circumvented by moving the placeholder element 10 in front of an opening 12 of the mold cavity 6 for a functional part 3 instead of the functional part holders 7, 8, 9 when the intention is to produce premoldings without functional parts 3.

In this case, the positioning of the functional part holders 7, 8 and 9 and of the placeholder element 10 is accomplished with the aid of the changing device 11 of the injection molding device 1.

On the injection molding device 1, the placeholder element 10 is thus used as a placeholder instead of a functional part holder 7, 8 or 9 with a functional part 3 in front of an insertion opening 12 of the mold cavity 6 for the functional parts in order to be able to produce premoldings without functional parts 3.

The method described below can furthermore be carried out on the injection molding device 1 described above. In this method, a functional part 3 is inserted into a clamping sleeve 3 of one of the functional part holders 7, 8, 9, after which the functional part 3 is held in its injection position with a clamping action by the clamping sleeve 32, wherein it projects at least partially into one mold cavity 6 of an injection mold 5 of the injection molding device 1.

During this process, the functional part 3 is inserted by the functional part insertion device 39 of the injection molding device 1 through a front-end insertion opening 47 of the functional part holder 7, 8, 9 into the functional part receptacle 37 of the functional part holder 7, 8, 9, which extends at least in some section within the clamping sleeve 32.

The clamping sleeve 32 is acted upon by the clamping ram 38 of the clamping device 33 in order to clamp the functional part 3 firmly in the clamping sleeve 32. During this process, the clamping slot 34 of the clamping sleeve 32 and, as a result, the functional part receptacle 37 of the functional part holder 7, 8, 9 are narrowed. More specifically, the pressure surface 36 of the clamping section 35 of the clamping sleeve 32 is acted upon during this process by the clamping ram 38. FIGS. 10 to 15, in particular, illustrate that, for this purpose, the clamping ram 38 is fed into the clamping sleeve 32 transversely to a longitudinal extent of said sleeve.

Figure 10:
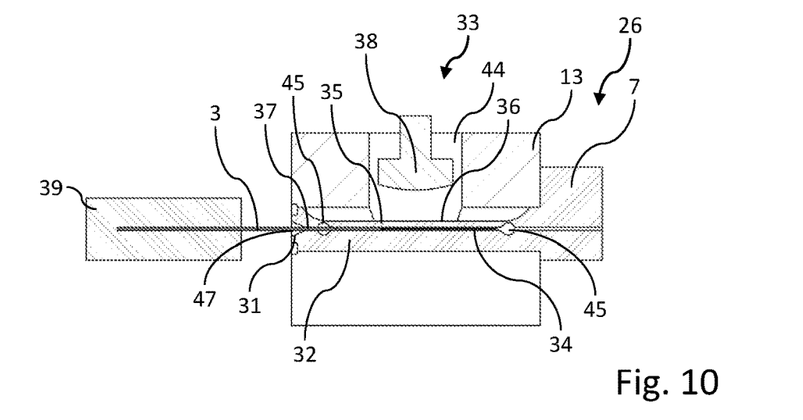
FIG. 10 shows a highly schematized and sectioned side view of the injection molding device to illustrate the insertion of functional parts into the functional part holder and the mode of operation of the clamping device, wherein a functional part in the form of a hollow needle has been inserted with the aid of a functional part holder through a front-end insertion opening having an insertion funnel of the functional part holder, while a clamping ram of the clamping device is arranged in the open position.

FIG. 10 shows that the clamping ram 38 is not acting on the pressure surface 36 of the clamping sleeve 32 when the functional part 3 is inserted into the clamping sleeve 32 by the functional part insertion device 39. The clamping ram 38 is then in a released position.

According to FIG. 11, the clamping ram 38 acts upon the clamping sleeve 32 with a retaining pressure force when the functional part 3 has been inserted at least some way into the clamping sleeve 32, as a result of which the functional part 3 is retained in the clamping sleeve 32 when the functional part insertion device 39 moves into its initial position and is removed from the functional part 3.

FIG. 12 illustrates that the functional part 3 is pushed into its injection position by closing the injection mold 5. During this process, the clamping ram 38 subjects the clamping sleeve 32 to a pressure force which is lower than the retaining pressure force applied to retain the functional part 3 in the clamping sleeve 32 when the functional part insertion device 39 is removed from the functional part 3. With the aid of the clamping ram 33, which is pressed lightly against the clamping sleeve 32, the functional part 3 can be prevented from breaking out sideways as the injection mold 5 is closed.

FIG. 13 shows the injection mold 3 shortly after the injection of the plastic to form the plastic molding 2. When the plastic molding 2 is being molded onto the functional part 3, the clamping ram 38 subjects the clamping sleeve 32 to a pressure force which is greater than the pressure force which the clamping ram 38 applies to the clamping sleeve 32 when the injection mold 5 is being closed and, during this process, the functional part 3 is being moved into its injection position.

According to FIGS. 14 and 15, the clamping ram 38 is in a released position both during the removal of the finished multicomponent part 4 and during the use of the placeholder element 10 instead of one of the functional part holders 7, 8, 9.

The invention furthermore relates to a computer program comprising commands which ensure that the injection molding device 1 described above carries out the methods described above and, in particular, the method as claimed in the method claim. The computer program is stored on a tangible computer-readable medium 41, i.e., a computer accessible memory, which can be read out by a controller 42 of the injection molding device 1.

The invention is concerned with improvements in the technical field of producing multicomponent parts 4 which comprise a functional part 3, in particular a hollow needle, onto which a plastic molding 2, in particular a syringe barrel 2, is molded. In order to be able to convert the injection molding device quickly and conveniently, said device has a changing device 11, by which it is possible optionally to move functional part holders 7, 8, 9, matched to different types of functional part, and/or a functional part holder 8 and a placeholder element 10 into the use position thereof in front of a mold cavity 6 of the injection mold 5 of the injection molding device 1.

LIST OF REFERENCE SIGNS

1 injection molding device
2 plastic molding/syringe barrel
3 functional part/hollow needle
4 multicomponent part/syringe
5 injection mold
6 mold cavity
7 first functional part holder
8 second functional part holder
9 third functional part holder
10 placeholder element
11 changing device
12 opening for 3 in 6
13 rotary holder
14 driving device
15 drive belt
16 drive motor
17 locking device
18 locking lever
19 locking pin
20 locking holes
21 guide pin
22 stroke cylinder
23 openable mold insert
24 nozzle-side mold plate
25 central mold plate
26 outer mold plate
27 hot runner nozzle
28 injection molding mandrel
29 partial cavity
30 injection unit
31 insertion funnel on 7, 8, 9
32 clamping sleeve
33 clamping device
34 clamping slot
35 clamping section
36 pressure surface 37 functional part receptacle
38 clamping ram
39 functional part insertion device
40 removal gripper
41 computer-readable medium
42 control device
43 pressure cylinder of 33
44 insertion opening for 38 in 13
45 widened portion of 34
46 receiving depression on 28 for 3
47 front-end insertion opening on 7, 8, 9

The invention claimed is:

1. An injection molding device (1), comprising:
an injection mold (5) which has at least one mold cavity (6) for at least partially accommodating a functional part (3) and configured for molding a plastic molding (2) onto the functional part (3) to form a multicomponent part (4),
a first functional part holder (7) for a first type of functional part and at least one of a further functional part holder (8) for a further type of functional part or a placeholder element (10),
a changing device (11), by which the first functional part holder (7) and at least one of the further functional part holder (8, 9) or the placeholder element (10) as a placeholder for a functional part holder (7, 8, 9) are positionable in a respective use position thereof on the mold cavity (6),
the changing device (11) comprises:
at least one rotary holder (13), on which the first functional part holder (7) and the at least one of the functional part holder (8, 9) or the placeholder element (10) are at least one of arranged or formed,
a driving device (14) for the at least one rotary holder (13), and
a locking device (17) comprising a locking lever (18) with at least one locking pin (19) arranged on the locking lever (18), the at least one locking pin (19) configured to engage the at least one rotary holder (13) to fix the at least one rotary holder (13) in a selected rotational position.

2. The injection molding device (1) as claimed in claim 1, wherein the placeholder element (10) situated in the use position is at least one of arranged in front of an opening (12) of the mold cavity (6) for the functional part (3) or closes off said opening from outside.

3. The injection molding device (1) as claimed in claim 1, wherein the driving device (14) comprises a drive belt (15), via which a drive motor (16) of the driving device (14) is connected to the at least one rotary holder (13).

4. The injection molding device (1) as claimed in claim 1, wherein the functional parts (3) are needles or hollow needles for syringes (4), the functional part holders (7, 8, 9) are designed as needle holders, the first functional part holder (7) is matched to a first needle diameter, and the further functional part holder (8, 9) is provided and is matched to a different needle diameter.

5. The injection molding device (1) as claimed in claim 1, further comprising respective openable mold inserts (23) for each said mold cavity (6).

6. The injection molding device (1) as claimed in claim 1, wherein the injection mold (5) has at least three mold plates (24, 25, 26), which are adjustable between a closed injection position and a processing position with the respective mold plates (24, 25, 26) spaced apart from one another, and the at least one mold cavity (6) is formed between two of the mold plates (24, 25), and the first functional part holder (7) and at least one of the further functional part holder (8, 9) or the placeholder element (10) are arranged on the third mold plate (26).

7. The injection molding device (1) as claimed in claim 6, wherein the changing device (11) is arranged on the third mold plate (26), on a rear side thereof facing away from the other two of the mold plates (24, 25).

8. The injection molding device (1) as claimed in claim 1, wherein at least one of the first functional part holder (7) or the further functional part holder (8, 9) each have an insertion funnel (31) configured for insertion of at least one of a functional part (3) or a clamping sleeve (32), or are configured as a clamping sleeve (32).

9. The injection molding device (1) as claimed in claim 1, further comprising a clamping device (33), by which functional parts (3) which are held in at least one of the first functional part holder (7) or the further functional part holder (8, 9) are clampable.

10. The injection molding device (1) as claimed in claim 8, wherein the clamping sleeve (32) has a clamping slot (34), which extends in a longitudinal direction of the clamping sleeve (32), the clamping slot (34) has a widened portion (45) in a region of each of its two ends in order to weaken a material of the clamping sleeve (32).

11. The injection molding device (1) as claimed in claim 8, wherein the clamping sleeve (32) has a clamping section (35) having an outer pressure surface (36), which is configured to be acted upon by a clamping ram (38) of the clamping device (34) to narrow a functional part receptacle (37) of the clamping sleeve (32).

12. The injection molding device (1) as claimed in claim 1, further comprising a functional part insertion device (39) configured to insert the functional parts (3) into at least one of the first functional part holder (7) or the further functional part holder (8, 9).

* * * * *